Oct. 9, 1962 T. H. LEACH 3,057,330
ANIMAL FEEDER
Filed July 31, 1959 2 Sheets-Sheet 2
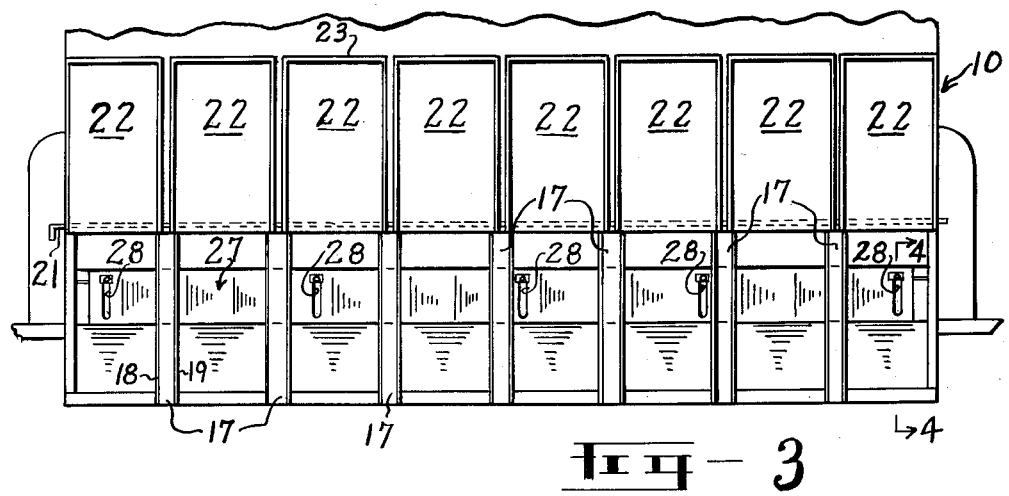
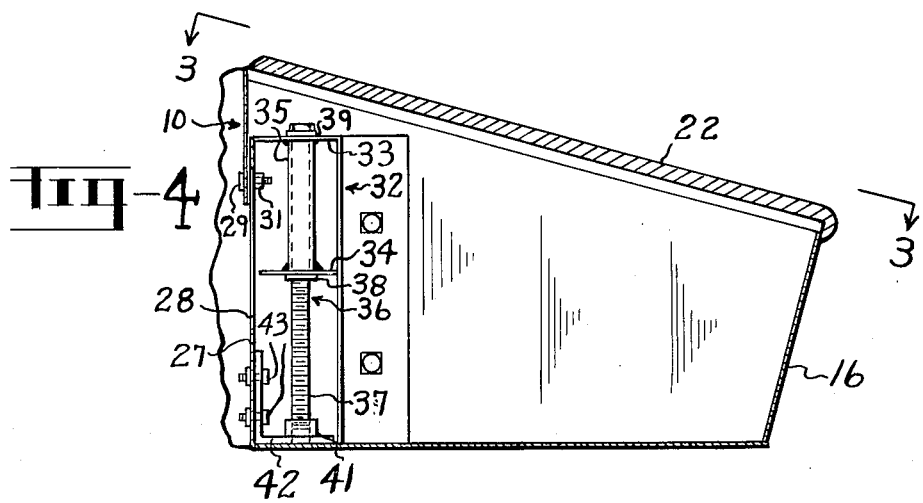
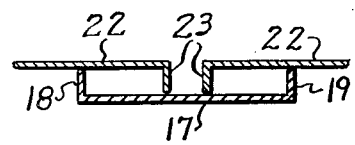
INVENTOR.
Thurman H. Leach
BY
Jennings Carter & Thompson
Attorneys

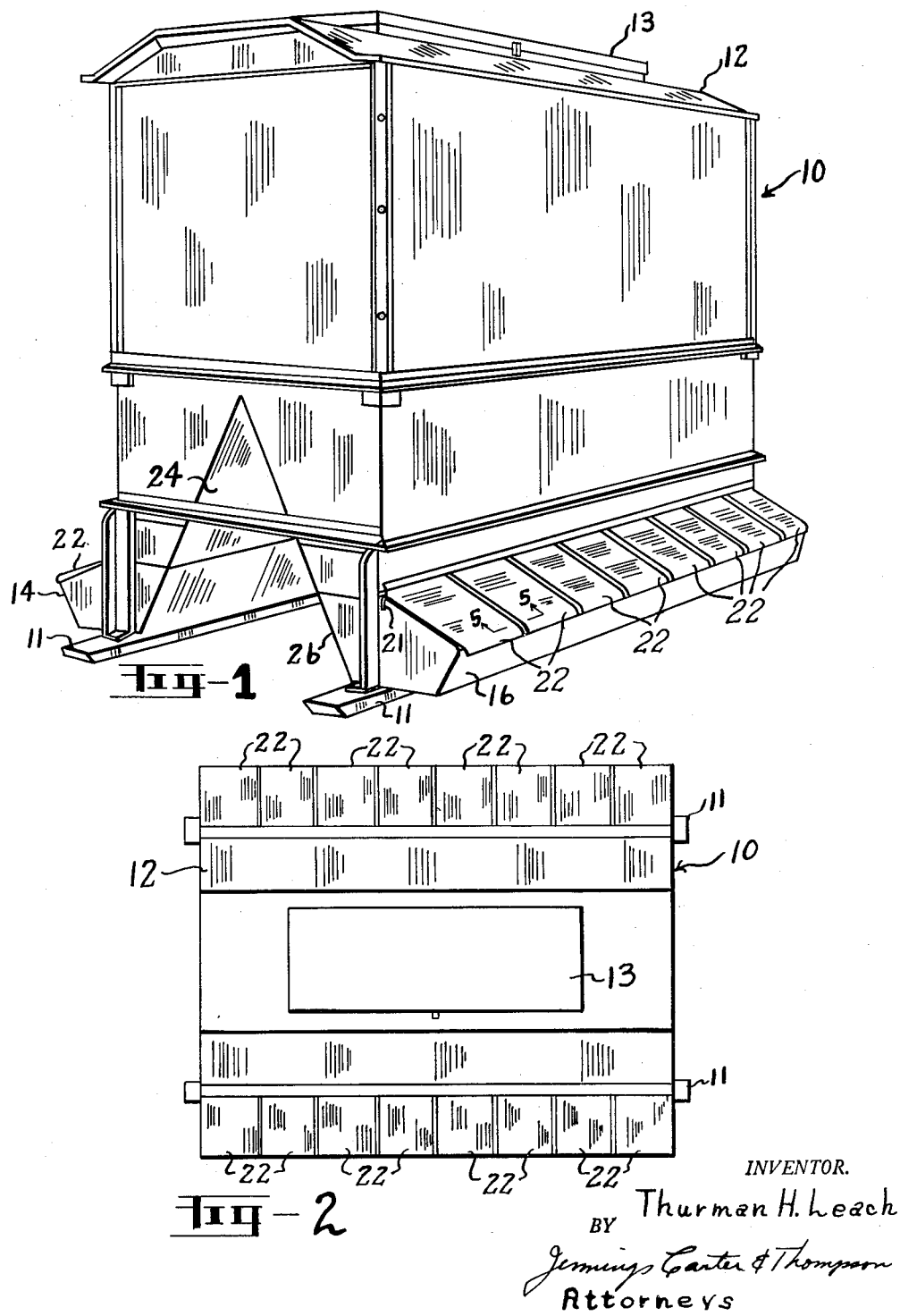

United States Patent Office 3,057,330
Patented Oct. 9, 1962

3,057,330
ANIMAL FEEDER
Thurman H. Leach, Post Office Drawer 1010,
Gadsden, Ala.
Filed July 31, 1959, Ser. No. 830,801
1 Claim. (Cl. 119—53)

This invention relates to an animal feeder and more particularly to an automatic feeder for livestock, such as hogs.

An object of my invention is to provide an animal feeder of the character designated in which a relatively thin, controlled amount of feed is maintained in the bottom of the feed trough at all times, thereby eliminating waste of feed and at the same time providing ample feed for the livestock.

Another object of my invention is to provide an animal feeder of the character designated in which even and free flow of feed is provided at all times without agitating means, whereby the feed remains in its original state and is not broken up into a powdered form.

A further object of my invention is to provide an animal feeder of the character designated in which the control means for regulating the flow of the feed into the feed trough is locked in selected positions whereby it cannot be actuated by hogs and the like as they feed from the feed trough.

A still further object of my invention is to provide an animal feeder of the character designated which shall be simple of construction, economical of manufacture and one which is completely enclosed except when the livestock is feeding therefrom, thereby maintaining the feed in a clean and dry condition.

Briefly, my improved animal feeder comprises a feed storage bin having at least one trough along one side thereof. The storage bin is provided with an inclined bottom wall which slopes downwardly toward the lower inner portion of the trough and is separated from the trough by a vertically movable plate-like member. Retaining means holds the plate-like member in selected vertical positions whereby a controlled amount of feed flows beneath the plate-like member into the trough as the feed is removed therefrom by the livestock.

A device embodying features of my invention is illustrated in the accompanying drawings, forming a part of this application, in which:

FIG. 1 is a perspective view of the feeder;
FIG. 2 is a top plan view of the feeder;
FIG. 3 is a fragmental view taken generally along the line 3—3 of FIG. 4 and showing the lower portion of the feeder, the cover members for the feed trough being in raised position for the sake of clarity;
FIG. 4 is an enlarged sectional view taken generally along the line 4—4 of FIG. 3 showing the cover members for the feed trough in closed position; and,
FIG. 5 is an enlarged sectional view taken generally along the line 5—5 of FIG. 1.

Referring now to the drawings for a better understanding of my invention, I show a feed storage bin 10 which is supported on suitable supports indicated at 11. The feed storage bin 10 may be opened at the top. However, where the storage bin is employed outside of a shelter, a cover member 12 is provided as shown in FIGS. 1 and 2. Feed is introduced into the storage bin 10 through a suitable door 13 provided in the cover member 12.

Mounted at each side of the storage bin 10 and adjacent the lower portion thereof, as shown in FIG. 1 are elongated feed troughs 14 and 16. Extending transversely of each of the troughs 14 and 16 are a plurality of longitudinally spaced channel members 17 having upturned legs 18 and 19, as clearly shown in FIG. 5. Pivotally connected to the lower portion of the storage bin 10 by means of an elongated rod 21 are a plurality of door sections 22 having depending flanges 23 at the periphery thereof. In view of the fact that the channel members 17 slope downwardly and outwardly over the outer edges of the troughs 14 and 16, they form drainage recesses for conveying away any water which flows over the sides of the door sections 22. That is, the depending flanges 23 fit within the channel 17 to form a water-proof closure for the feed troughs 14 and 16 when not in use. The channel members 17 also form trough separators whereby the livestock feeding from the troughs feeds from one particular location, thus preventing the livestock from moving from one end of the trough to the other as they feed therefrom. By providing individual trough sections defined by the channel separator members 17 a plurality of hogs or the like, can feed from the trough without interfering with each other.

The bottom wall of the storage bin 10 slopes downwardly toward the inner portions of the feed troughs 14 and 16 as at 24 and 26, at an angle of approximately 60° from the horizontal, as shown in FIG. 1, whereby there is free flow of the feed to the point of discharge adjacent the lower inner portion of the troughs.

Separating the troughs 14 and 16 from the downwardly inclined bottom walls 24 and 26, respectively, are vertically extending plate-like members 27. Each of the plate-like members 27 extends the entire length of its associated trough and is provided with a plurality of vertically extending slots 28 which are in position to receive the outer ends of bolts 29 which pass through suitable openings in the lower portion of the storage bin 10, as shown in FIG. 4. Nuts 31 engage the outer ends of the bolts 29 whereby the vertical plate 27 may be locked in selected positions.

Mounted adjacent each end of the troughs 14 and 16 are supporting bracket 32 having horizontally extending leg portions 33 and 34. Positioned between and secured to the leg portions 33 and 34 is a vertically extending bearing sleeve member 35. Mounted for rotation within the bearing sleeve member 35 is an elongated actuating member 36 having a threaded lower end 37. Axial movement of the actuating member 36 relative to the bearing sleeve member 35 is limited by an abutment 38 secured to the actuating member 36 beneath the leg member 34 and an upper abutment 39 secured to the upper portion of the actuating member 36 above the leg member 33. An internally threaded member 41 is in threaded engagement with the lower threaded portion 37 of the actuating member 36 and is connected to an angle bracket 42 which in turn is secured to the adjacent end of the plate-like member 27 by suitable bolts 43.

In view of the fact that each end of each plate-like member 27 is operatively connected to an actuating member 36, the plate-like member 27 may be raised and lowered to any selected elevation by rotating the actuating member 36 in the proper direction. It will be noted that the abutment 39 has a hexagonal head for receiving a suitable tool, such as a wrench, whereby the actuating member 36 is rotated.

From the foregoing description, the operation of my improved animal feeder will be readily understood. The feed is introduced into the storage bin through the closure member 13. After the feed is positioned within the storage bin, the closure member 13 is secured in place, thereby providing a water proof storage bin. With the feed in the storage bin, the nuts 31 are all loosened whereby the plate-like members 27 may be moved to selected positions. The plate-like members 27 are raised by rotating the actuating members 36 until the lower edges of the plate-like members 27 are a sufficient distance above the bottoms of the troughs 14 and 16 to permit the deposit of a relatively thin layer of feed in the bottom of the troughs.

In view of the fact that the bottom walls 24 and 26 of the feed bin 10 slope at an angle of approximately 60° from the horizontal, the feed flows freely and evenly beneath the lower edges of the plate members 27 whereupon the amount of feed deposited in the troughs 14 and 16 may be accurately controlled. By introducing only a relatively thin layer of feed onto the bottom of the trough there is no substantial build up of feed within the trough and the hogs do not push the feed out of the trough, thereby eliminating waste. At the same time, by providing free flow of the feed into the trough immediately, the thin layer of feed is consumed by the hogs, there is a constant supply of feed to the hogs without waste. Also, by providing the free and even flow of the feed from the feed storage bin 10 into the troughs 14 and 16, it is not necessary to employ agitators and the like for conveying the feed. This is very desirable in view of the fact that most hog feeds are in the form of pellets and it is most desirable that the pellets remain in their original condition due to the fact that hogs had rather eat feed in the form of pellets than to eat powdered feed. Where agitators are employed to convey the feed or to provide even flow of the feed, the feed is broken up into a powdered form.

After the plate-like members 27 are adjusted to the proper elevation to continuously discharge a relatively thin layer of feed onto the bottom of the feed troughs, the nuts 31 are run in on the bolts 29 whereby the plate-like members 27 are locked in a fixed position.

From the foregoing, it will be seen that I have devised an improved feeder for animals, such as hogs and the like. By continuously introducing a uniform, controlled amount of feed onto the bottom of the feed trough, the hogs have all the feed they can eat and at the same time there is no excess build up of feed in the troughs which would incur waste. By providing means at opposite ends of the plate-like member for adjusting the plate-like members to the desired elevations, together with means for locking the plate-like members in the adjusted position, there is no danger of the hogs moving the plate out of its adjusted position. This is a very desirable feature in a hog trough in that it is well known that hogs like to root and if the plate-like member is not secured firmly in place, it will soon be moved out of proper adjustment.

While I have shown my invention in but one form, it will be obvious to those skilled in the art that it is not so limited but is susceptible of various changes and modifications without departing from the spirit thereof, and I desire, therefore that only such limitations shall be placed thereupon as are specifically set forth in the appended claim.

What I claim is:

In an animal feeder including a feed storage bin having a pair of spaced generally vertically extending side walls and a pair of intersecting downwardly and outwardly inclined bottom walls to form an inverted V-shaped bottom, a feed trough along each side of the bin extending outwardly therefrom, each feed trough comprising a horizontal bottom wall extending outwardly from the adjacent inclined bottom wall and beneath the adjacent vertically extending side wall, a vertically extending plate-like member mounted for vertical movement relative to said vertically extending side wall adjacent the inner portion of the bottom wall of the trough and separating the trough from the inclined bottom wall so that the feed in the trough is supported entirely by the horizontal bottom wall of the trough after passing beneath said plate-like member, said plate-like member extending substantially the entire length of the adjacent side wall, a plurality of longitudinally spaced channel members having upturned legs extending transversely over each trough and sloping downwardly and outwardly from the side walls, a plurality of door sections over the troughs and having depending downturned flanges on opposite sides thereof fitting within the channel members thereby to form a water-proof closure for the troughs, means mounting the door sections for individual pivotal movement, vertically extending externally threaded members mounted for rotation adjacent each end of the plate-like member, means holding said threaded members against axial movement, internally threaded members in threaded engagement with said externally threaded members, means connecting said internally threaded members to said plate-like members adjacent the ends thereof so that the plate-like members are moved vertically to selected vertical positions relative to the bottom of the trough in response to rotation of said externally threaded members whereby a controlled amount of feed flows beneath said plate-like member into said trough, and means for rotating said externally threaded members.

References Cited in the file of this patent

UNITED STATES PATENTS

| | | |
|---|---|---|
| 1,339,763 | Johnson | May 11, 1920 |
| 1,671,041 | Mendenhall | May 22, 1928 |
| 1,746,558 | Rowe | Feb. 11, 1930 |
| 1,750,025 | Rowe | Mar. 11, 1930 |
| 2,661,720 | Rysdon et al. | Dec. 8, 1953 |
| 2,691,360 | Ballard | Oct. 12, 1954 |
| 2,984,007 | Lundin | May 16, 1961 |

FOREIGN PATENTS

| | | |
|---|---|---|
| 8,032 | Great Britain | Nov. 29, 1906 |
| 23,864 | Sweden | Jan. 11, 1908 |
| 201,365 | Great Britain | Aug. 2, 1923 |
| 104,736 | Australia | Aug. 3, 1938 |
| 810,677 | Germany | Aug. 13, 1951 |